US007046963B2

(12) United States Patent
Luo et al.

(10) Patent No.: US 7,046,963 B2
(45) Date of Patent: May 16, 2006

(54) METHOD AND APPARATUS OF SIGNAL ESTIMATION OVER GENERALIZED FADING CHANNEL

(75) Inventors: Tao Luo, San Diego, CA (US); Young-Chai Ko, San Diego, CA (US)

(73) Assignee: Texas Instruments Incorporated, Dallas, TX (US)

( * ) Notice: Subject to any disclaimer, the term of this patent is extended or adjusted under 35 U.S.C. 154(b) by 646 days.

(21) Appl. No.: 10/353,489

(22) Filed: Jan. 29, 2003

(65) Prior Publication Data
US 2004/0176038 A1    Sep. 9, 2004

(51) Int. Cl.
*H04B 17/00*     (2006.01)
(52) U.S. Cl. .................................. 455/67.11; 455/67.13
(58) Field of Classification Search ................. 455/10, 455/504, 506, 63.1, 65, 67.13, 436, 442
See application file for complete search history.

(56) References Cited

U.S. PATENT DOCUMENTS

| 5,634,206 A | * | 5/1997 | Reed et al. | ............... | 455/277.2 |
| 6,954,618 B1 | * | 10/2005 | Bonhomme | .................. | 455/65 |
| 2002/0165626 A1 | * | 11/2002 | Hammons et al. | ............ | 700/53 |

OTHER PUBLICATIONS

Daniel Wong and Donald C. Cox, "Estimating Local Mean Signal Power Level in a Rayleigh Fading Environment", *IEEE Trans. Veh. Technol.*, vol. 48, pp. 956-959, May 1999.
Y.-C. Ko and M.-S. Alouini, "Estimation of the local mean signal power over Nakagami—m fading channels", *IEEE International Sumposium on Personal , Indoor and Mobile Radio on Communications*, (PI MRC 2001) , San Diego, CA, vol. 1, pp. 107-112.
J. Cheng and N. C. Beaulieu, "Maximum-Likelihood based estimation of the Nakagami m parameter", *IEEE Commun. Lett.*, vol. 5, No. 3, pp. 101-102, Mar. 2001.
3 GPP TS 25. 101, V3. 12.0 (Dec. 2002), $3^{rd}$ Generation Partnership Project; Technical Specification Group Radio Access Networks; UE Radio Transmission and Reception (FDD) , Release 1999.

* cited by examiner

*Primary Examiner*—Duc Nguyen
*Assistant Examiner*—Justin Lee
(74) *Attorney, Agent, or Firm*—Ronald O. Neerings; Wade James Brady, III; Frederick J. Telecky, Jr.

(57) ABSTRACT

A methodology of signal estimation over the generalized fading channel can be applied to any parameter whose dB value is required to be estimated. The estimator is shown to be asymptotically efficient in a number of samples and the amount of fading. Theoretical and simulation results confirm that the SINR estimator implemented using the methodology outperforms the sample-average estimator, which is currently used in most of systems and robust to the channel variation.

23 Claims, 4 Drawing Sheets

METHOD AND APPARATUS OF SIGNAL ESTIMATION OVER GENERALIZED FADING CHANNEL

BACKGROUND OF THE INVENTION

1. Field of the Invention

This invention relates generally to wireless communications, and more particularly to a method and apparatus for estimating a signal over a generalized fading channel without reference to any table(s), wherein the methodology can be applied to any parameter whose dB value is needed to be estimated.

2. Description of the Prior Art

In wireless communications, many parameters must be estimated in the log domain or dB value for power control, soft handoff, radio link quality monitoring, finger selection, and the like. Bias in the estimated parameters significantly degrades the receiver performance. Known solutions use complicated tables to correct the bias; but the table needs to be adapted to different scenarios such as different channel models, different Doppler spreads, number of paths and so on. In many cases, it is difficult to know the exact scenarios due to estimation errors.

It would therefore be desirable and advantageous in view of the foregoing to provide a general solution for estimating parameters in dB value such the bias is corrected inherently without using any table.

SUMMARY OF THE INVENTION

The present invention is directed to a methodology of signal estimation over the generalized fading channel that can be applied to any parameter whose dB value is required to be estimated. The estimator is shown to be asymptotically efficient in a number of samples and the amount of fading. Theoretical and simulation results confirm that the SINR estimator implemented using the methodology outperforms the sampleaverage estimator, which is currently used in most of systems and robust to the channel variation.

A method according to one embodiment of the invention comprises the steps of: averaging an input signal via a first averaging filter to generate a first averaged output signal; filtering the first averaged output signal via a first log filter to generate a first log domain value; scaling the first log domain value by a first constant; filtering the input signal via a second log filter to generate a second log domain value; averaging the second log domain value via a second averaging filter to generate a second averaged output signal; scaling the second averaged output signal by a second constant; and summing the second averaged output signal with the scaled first log domain value to generate an estimated signal over the generalized fading channel.

According to another embodiment, a wireless communication system comprises a first signal averaging filter configured to average an input signal there through; a first log filter configured to generate a first log domain value in response to the averaged input signal; a first scaling element configured to scale the first log domain value by a first constant; a second log filter configured to generate a second log domain value in response to the input signal; a second signal averaging filter configured to average the second log domain value there through; a second scaling element configured to scale the averaged second log domain value by a second constant; and a summing element configured to add the scaled first log domain value and the scaled averaged second log domain value to generate an estimated signal over a generalized fading channel in response to the input signal.

BRIEF DESCRIPTION OF THE DRAWINGS

Other aspects and features of the present invention and many of the attendant advantages of the present invention will be readily appreciated as the same become better understood by reference to the following detailed description when considered in connection with the accompanying drawings wherein.

Figure 1A:
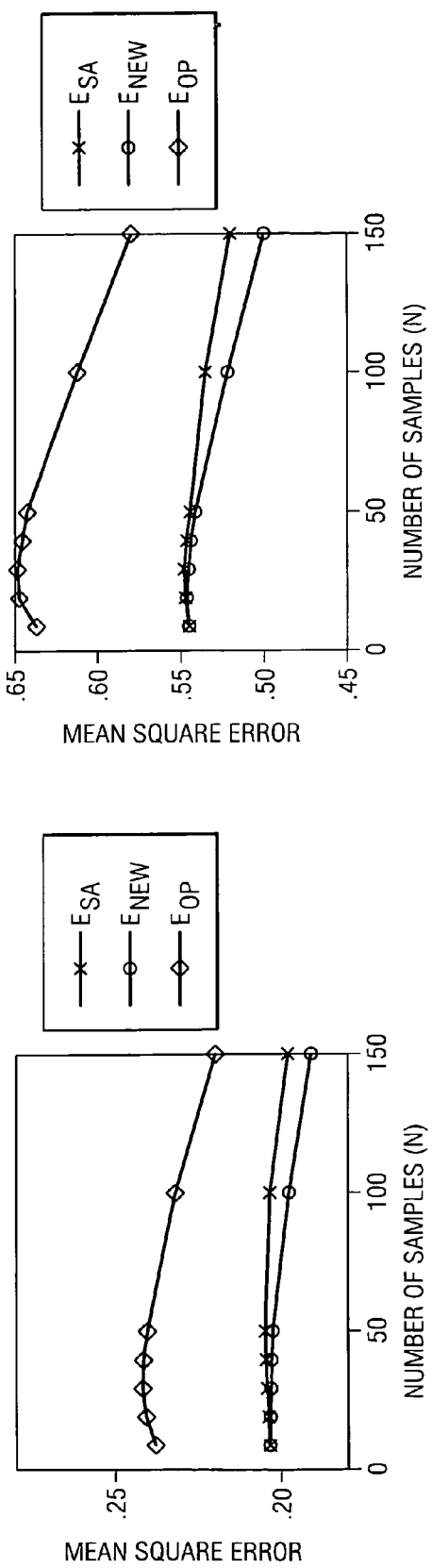
FIGS. 1a–1d are graphs depicting performance comparisons between $E_{sa}$, $E_{new}$ and $E_{op}$ over Rayleigh fading channels with vehicle speed 3 km/hr for −10 dB, −5 dB, 5 dB and 10 dB respectively.
Figure 1B:
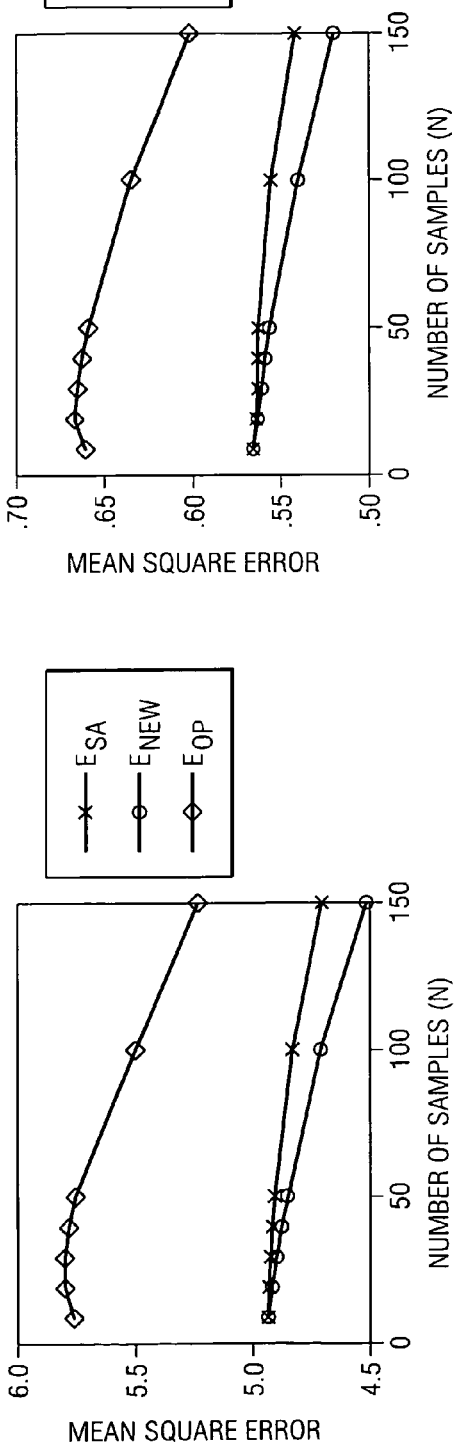
Figure 1C:
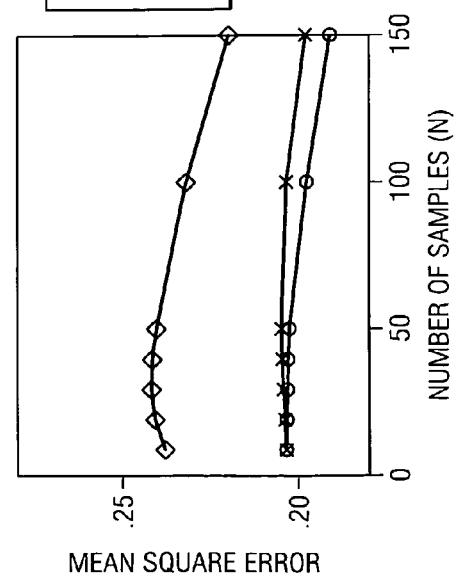
Figure 1D:
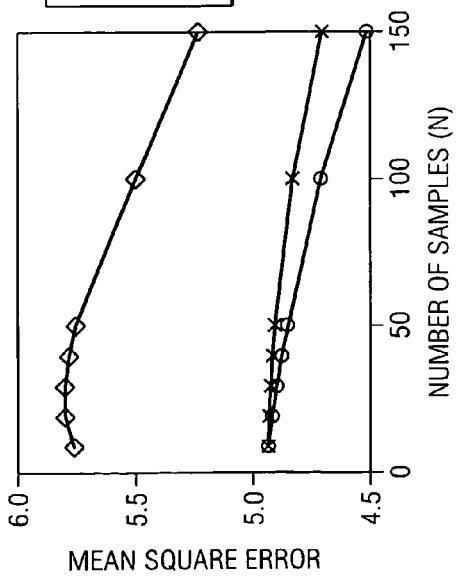
Figure 2A:
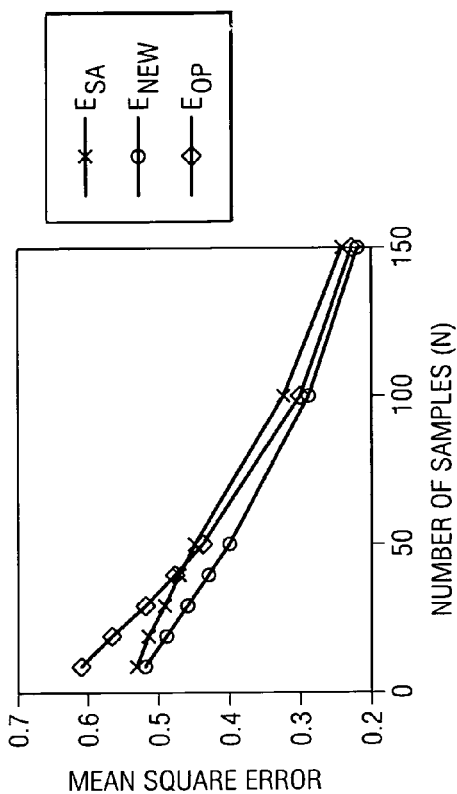
FIGS. 2a–2d are graphs depicting performance comparisons between $E_{sa}$, $E_{new}$ and $E_{op}$ over Rayleigh fading channels with vehicle speed 30 km/hr for −10 dB, −5 dB, 5 dB and 10 dB respectively.
Figure 2B:
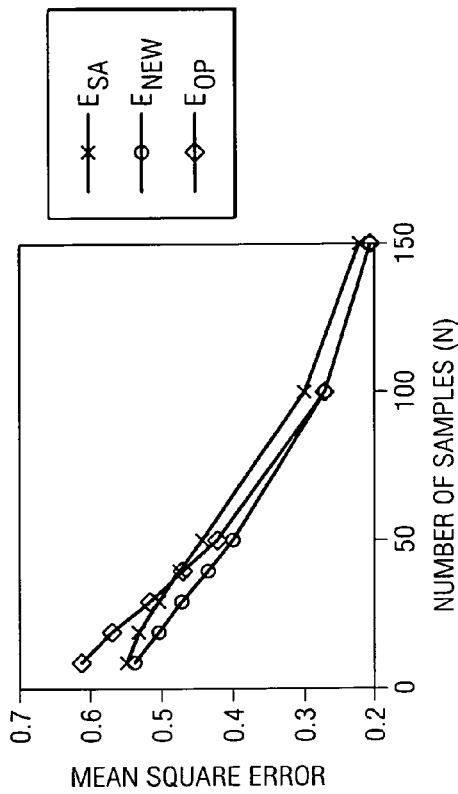
Figure 2C:
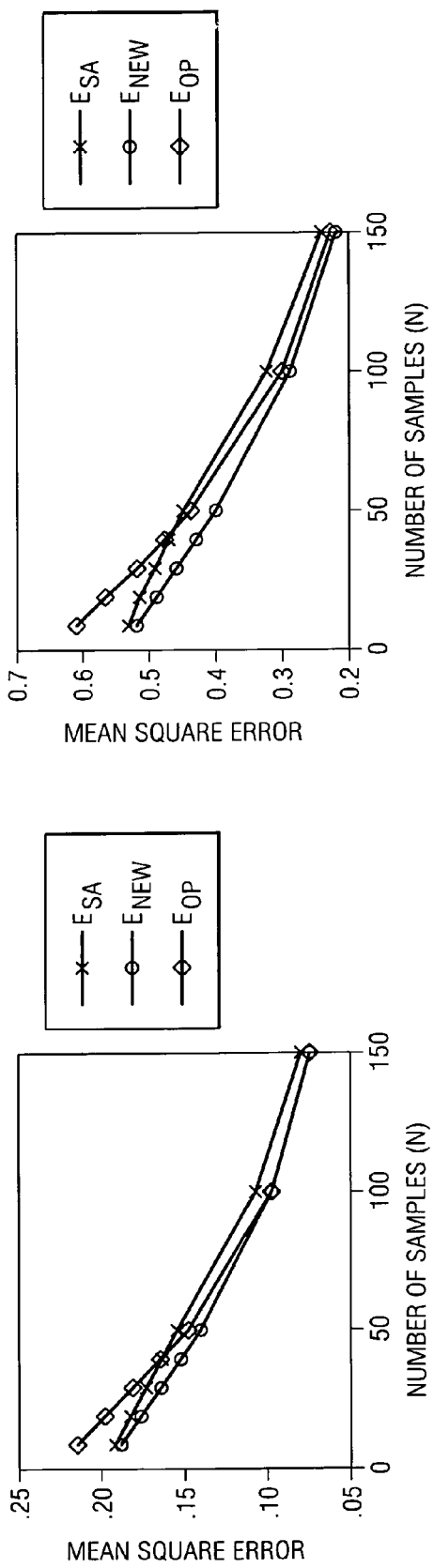
Figure 2D:
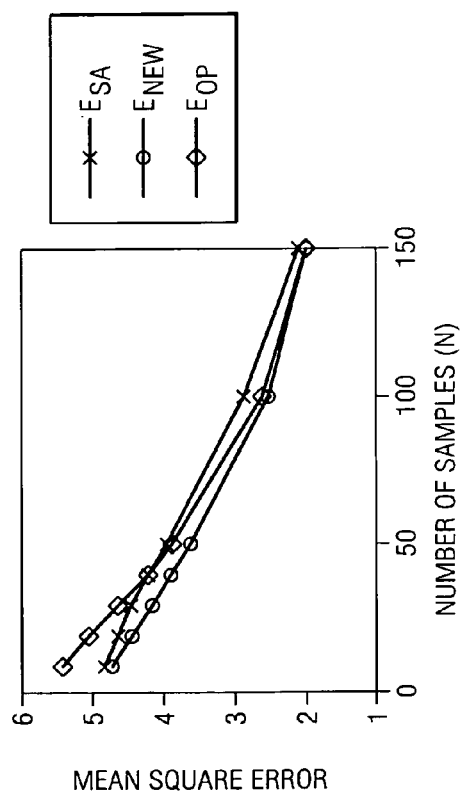
Figure 3A:
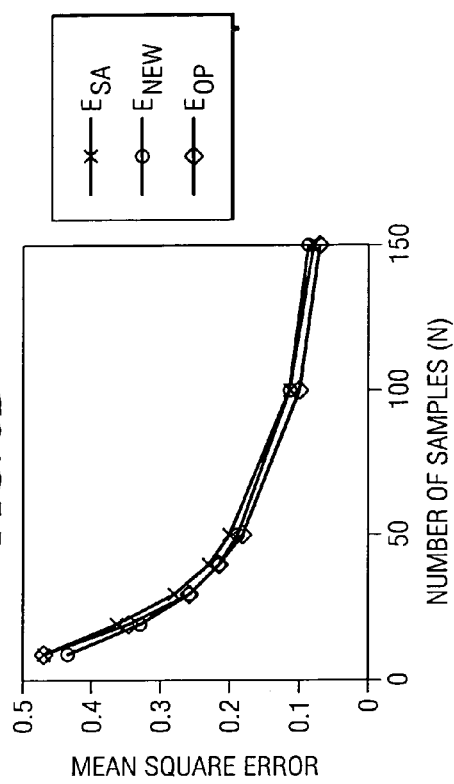
FIGS. 3a–3d are graphs depicting performance comparisons between $E_{sa}$, $E_{new}$ and $E_{op}$ over Rayleigh fading channels with vehicle speed 120 km/hr for −10 dB, −5 dB, 5 dB and 10 dB respectively.
Figure 3B:
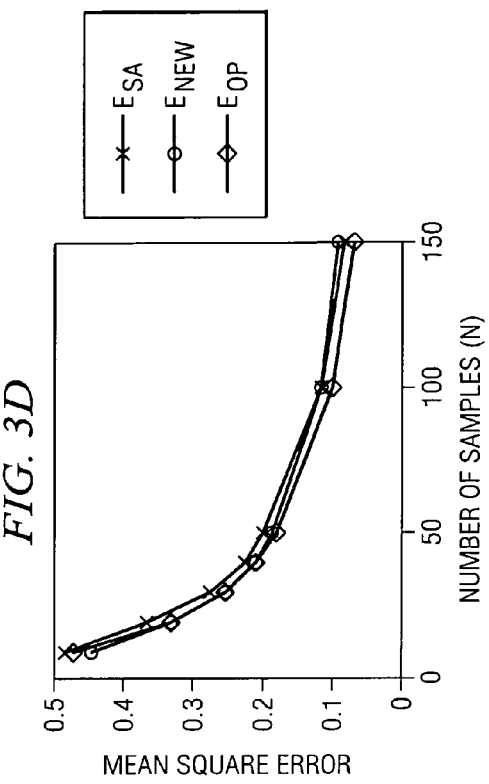
Figure 3C:
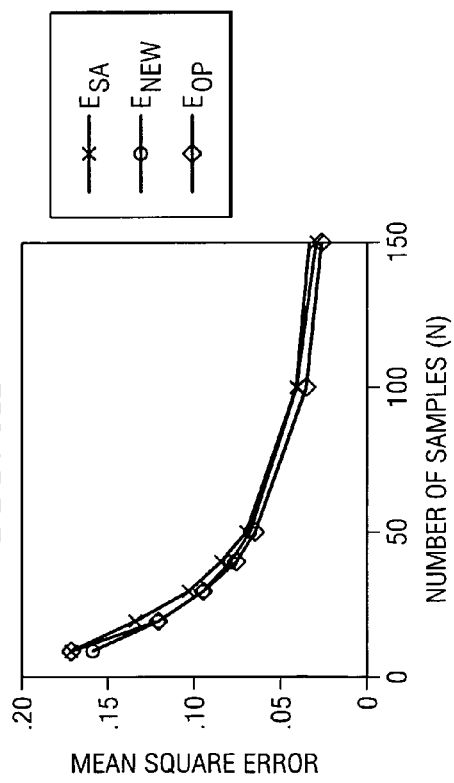
Figure 3D:
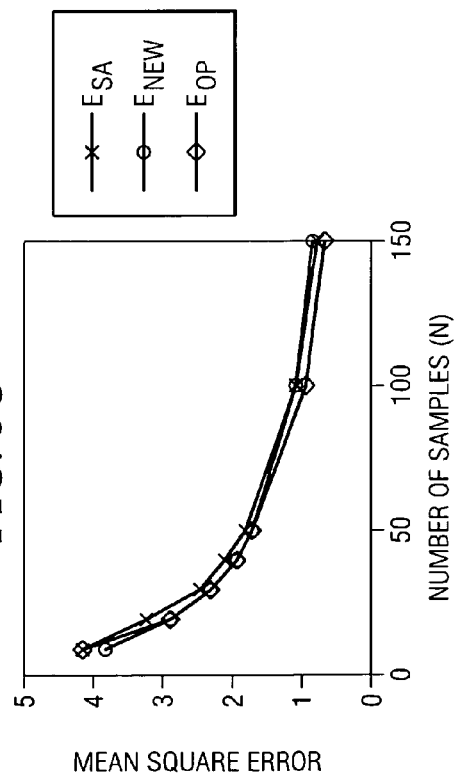

While the above-identified drawing figures set forth particular embodiments, other embodiments of the present invention are also contemplated, as noted in the discussion. In all cases, this disclosure presents illustrated embodiments of the present invention by way of representation and not limitation. Numerous other modifications and embodiments can be devised by those skilled in the art which fall within the scope and spirit of the principles of this invention.

DETAILED DESCRIPTION OF THE PREFERRED EMBODIMENTS

This embodiments discussed herein below present a method and apparatus of signal estimation over the generalized fading channel and that can be applied to any parameter whose dB value is required to be estimated. The estimator is shown to be asymptotically efficient in a number of samples and the amount of fading. Theoretical and simulation results confirm that the SINR estimator described herein below outperforms the sample-average estimator, which is currently used in most of systems and robust to the channel variation.

Signal to interference plus noise ratio (SINR) has many applications in wireless communications. For example, in CDMA systems, a power control algorithm may use the SINR information to determine power control commands, which is essential for efficient operation of the network. Also, accurate estimation of SINR is very important for the successful implementation of hand-off. In W-CDMA networks, the mobile may use the estimated SINR to determine the quality of the radio link, e.g., whether it should shut off its transmitter to reduce the unnecessary interference to the network. In CDMA systems, which employ a RAKE receiver, the signal from each finger has a type of selection combining technique, which chooses the fingers by comparing the estimated SINR of each finger to a certain threshold value. In this case accurate SINR estimation is very important.

Estimating SINR requires two parameters: the estimations of signal power and noise power. The ratio of these two estimated values are the estimated SINR. In many cases, it is much easier to estimate the noise power. For example, in W-CDMA systems, pilot symbols in the common pilot channel (CPICH) may be used to estimate the noise power. In contrast, the estimation of the signal power may be challenging since the variation of the desired signal is usually larger compared with the noise power which may be the sum of many users. For some systems like CDMA based systems, the SINR of interest may be very low, for example, −10 dB. In such a low value of SINR, the signal power estimator may be very difficult especially due to the presence of the fading.

In real applications, the estimation of SINR in a decibel (dB) scale is of interest rather than a linear scale. Some estimators have appeared in the literature. A brief review of SINR estimators in the literature is first presented herein below to set forth a background for a better understanding of the present embodiments.

First, define the received SINR as $$\gamma = a^2 = \frac{h^2 E_S}{N_o}$$

where h is the fading amplitude and $N_o$ is the one-sided power spectral density of interference plus AWGN, which also needs to be estimated. Next, assume that the perfect estimator of noise level $N_o$ is available. In one application for estimating the noise power discussed further herein below, N signal samples are represented as $\alpha_i$, i=1, 2, ..., N. The term $X_i=20 \log(\alpha_i)$ is defined where $\log(\cdot)$ denotes the logarithm with basis 10 and $\ln(\cdot)$ is the natural logarithm. The problem is to estimate the average value of X, $\overline{X}$. The sample-average estimator is $$E_{sa} = \frac{1}{N} \sum_{j=1}^{N} X_j.$$

Although this estimator is unbiased and consistent, it does not have minimum variance.

D. Wong and D.C. Cox, "Estimating local mean signal power level in a Rayleigh fading environment" *IEEE Trans. Veh. Technol.*, vol. 48, pp. 956–959, May 1999 discloses derivation of the optimum minimum variance unbiased estimators (OMVU) under the following assumptions:

1. Sample signals $\alpha_i$ are independent identically distributed (i.i.d.);
2. $\alpha_i$ have the same mean since the local mean varies slowly;
3. $\alpha$ is Rayleigh distributed. The probability density function (PDF) of $\alpha$ is $$P_\alpha(\alpha; \Omega) = \frac{2\alpha}{\Omega} \exp\left(-\frac{\alpha^2}{\Omega}\right),$$

where $$\Omega = E(\alpha^2) = \frac{E[h^2]E_s}{N_o}$$

is the fading average (linear) power; and
4. The background noise is small compared with the desired signal.

The resulting OMVU estimator is $$E_{op} = 10\left[\log(T) - \frac{H_{N-1}}{\ln(10)}\right] \quad (1)$$

where $$T = \sum_{j=1}^{N} \alpha_j^2 = \sum_{j=1}^{N} 10^{\frac{X_j}{10}}$$

and $H_n = 1 + 1/2 + 1/3 + \ldots + 1/n$. The variance of the estimator (1) is shown as $$\text{Var}(E_{op}) = \frac{100}{(\ln 10)^2}\left[\frac{\pi^2}{6} - \sum_{k=1}^{N-1} \frac{1}{k^2}\right].$$

The estimator (1) is shown by Wong et al. to be unbiased and to asymptotically approach the Cramer-Rao lower bound (CRLB), i.e., $$CRLB(E_{op}) = \frac{100}{(\ln 10)^2} \frac{\pi^2}{6}.$$

Y.-C. Ko and M.-S. Alouini, "Estimation of the local mean signal power over Nakagami-m fading channels", *IEEE International Symposium on Personal, Indoor and Mobile Radio Communications*, (PIMRC 2001), San Diego, Calif. Vol. 1, pp. 107–112, September 2001, generalized the results of Wong et al. to a Nakagami-m fading channel model. The assumptions of Ko et al. are:

1. Sample signals $\alpha_i$ are independent identically distributed (i.i.d.).
2. $\alpha_i$ have the same mean since the local mean varies slowly.
3. $\alpha$ is Nakagami-m fading distributed. The PDF of this Nakagami-m distribution is $$P_\alpha(\alpha; \Omega, m) = \frac{2m^m \alpha^{2m-1}}{\Omega^m \Gamma(m)} \exp\left(-\frac{m\alpha^2}{\Omega}\right),$$

where $\Gamma(.)$ is the gamma function and m is the Nakagami-m fading parameter that ranges from ½ to ∞.
4. The background noise is small compared with the desired signal. The resulting estimator is $$E_{op,m} \frac{10}{\ln 10}[\ln(T) - \psi(mN) + \psi(m)] \quad (2)$$

where $\psi(x) = d/dx\Gamma(x)$ is known as the Euler psi function and the m in equation (2) is the parameter to be estimated.

It was shown by Ko et al. that $$\text{Var}(E_{op,m}) = \kappa^2 \zeta(2, mN)$$

where $$\kappa = \frac{10}{(\ln 10)} = 4.3429$$

and $\zeta(\cdot, \cdot)$ is Riemann's zeta function.

Using the fact that $$\zeta(2, x) \approx \frac{1}{x}$$

for large x, it can be shown the variance of estimator (2) converges rapidly to the CRLB, i.e., $$\frac{\kappa^2}{mN}.$$

J. Cheng and N. C. Beaulieu, "Maximum-Likelihood based estimation of the Nakagami m parameter", *IEEE Commun. Lett.*, Vo. 5, No. 3, pp. 101–102, March 2001, disclosed that when m is restricted to integer values, $$E_{op,m,int} = 10\left[\log(T) - \frac{1}{\ln(10)} \sum_{n=1}^{m(N-1)} \frac{1}{m+n-1}\right],$$

where it can now be seen that equation (1) is a special case of equation (2), i.e., m=1.

The present inventors discovered the estimators in (1) and (2) to have the following drawbacks. First, signal samples are generally correlated where the correlation is a function of the mobile speed. For example, in W-CDMA systems, the signal samples may be within one slot (0.667 ms). For a mobile with speed 250 Km/h, the coherent time is around 2 ms. Thus, there is high correlation between data samples, even for this high speed. Second, those two estimators are model-based: they are optimum only and only if the channel is Rayleigh fading for (1) and Nakagami-m fading for (2). Thus, if the channel does not follow those assumed fading models, the estimators (1) and (2) may cause large estimation errors. Third, the estimator (2) requires an estimated Nakagami-m parameter m, which is strongly model-based. Finally, if the desired range of SINR is low like in CDMA systems, the estimators (1) and (2) may not work well.

The most preferred embodiment of the invention employs two filters for parameter estimation. One filter operates in the linear domain while the other filter operates in the log domain. In one embodiment, these two filters function together to generate an SINR estimator, wherein this resulting estimator is a linear combination of the two filters in which the bias is corrected inherently due to the linear combination of the two filters. The resulting estimator is represented as $$E_{new} = 10(1-\mu)\log(E(Y^2)) + \mu E(10 \log(Y^2)) \quad (3)$$

where $\mu$ is a tunable real number between [0, 1] and the E(.) function is a generic average function. An IIR filter, FIR filter, or any other filters which perform average operations, can for example, be employed in the embodiments discussed herein. The estimator in equation (4) below uses the arithmetical mean as an example, i.e., $$E_{new} = 10(1-\mu)\log\left(\frac{1}{N}\sum_{j=1}^{N} Y_j^2\right) + \mu \frac{1}{N}\sum_{j=1}^{N}(10\log(Y_j^2)) \quad (4)$$

The estimator in equation (4) does not require any channel model assumption. In fact, the present inventors have proven that if the channel is Nakagami-m distributed, equation (4) approximately equals equation (2). Further, equation (4) does not need to estimate the m parameter since the m estimator is inherently included in the estimator as now discussed herein below.

First, make the same assumptions discussed herein before with reference to equations (1) and (2), e.g., the background noise is assumed constant over the range of the interest. It can be appreciated however, this assumption is only for proof purposes. In any real implementation, the estimators in (3) and (4) do not require this assumption; and one has many choices for the noise estimator.

$$E_{new} = 10(1-\mu)\log(\frac{1}{N}\sum_{j=1}^{N}\alpha_j^2) + \mu\frac{1}{N}\sum_{j=1}^{N}(10\log(\alpha_j^2))$$

$$= 10\log(\frac{1}{N}\sum_{j=1}^{N}\alpha_j^2) + \mu\left[\frac{1}{N}\sum_{j=1}^{N}(10\log(\alpha_j^2)) - \log(\frac{1}{N}\sum_{j=1}^{N}\alpha_j^2)\right]$$

$$= 10\log\left(\frac{T}{N}\right) + \mu\left[10\log\left(\left[\prod_{j=1}^{N}\alpha_j^2\right]^{\frac{1}{N}}\right) - \log\left(\frac{T}{N}\right)\right]$$

$$= 10\log(A) + \mu\left[10\log\left(\frac{G}{A}\right)\right],$$

where $$G = \left[\prod_{n=1}^{N}\alpha_j^2\right]^{\frac{1}{N}}$$

and $$A = \frac{T}{N} = \frac{1}{N}\sum_{j=1}^{N}\alpha_j^2$$

is the geometric and arithmetic mean of the samples, respectively. Both Ko et al. and Cheng et al. have shown that the maximum-likelihood (ML) estimation of the m parameter of the Nakagami-m distribution is approximately $$\hat{m}_{ML} = \left[2\ln\left(\frac{A}{G}\right)\right]^{-1}. \quad (5)$$

From equation (5), it can be shown that $$\ln\left(\frac{G}{A}\right) = -\frac{1}{2\hat{m}_{ML}}. \quad (6)$$

Then, $$E_{new} = 10\log(A) + \mu\left[10\log\left(\frac{G}{A}\right)\right] \quad (7)$$
$$\approx 10\log(A) - \mu\frac{10}{\ln 10}\frac{1}{2\hat{m}_{ML}}.$$

Recalling that $$E_{op,m} = \frac{10}{\ln 10}\left[\ln(T) - \psi(mN) + \psi(m)\right],$$

it can then be shown that $$E_{op,m} = \frac{10}{\ln 10}[\ln(T) - \psi(mN) + \psi(m)] \quad (8)$$
$$= \frac{10}{\ln 10}[\ln(A) + \ln(N) - \psi(mN) + \psi(m)]$$
$$\stackrel{a}{\approx} \frac{10}{\ln 10}[\ln(A) + \ln(N) - \ln(m) + \ln(N) + \psi(m)]$$
$$= \frac{10}{\ln 10}[\ln(A) - \ln(m) + \psi(m)]$$
$$\stackrel{a}{\approx} \frac{10}{\ln 10}\left[\ln(A) - \ln(m) + \left(\ln(m) - \frac{1}{2m}\right)\right]$$
$$\frac{10}{\ln 10}\left[\ln(A) - \frac{1}{2m}\right],$$

where step (a) uses the following fact: when x is large, $\psi(x) \approx \ln x$. Thus, the difference between equation (5) and equation (6) is $$|E_{op,m} - E_{new}| = \frac{10}{\ln 10}\frac{1}{2m}|1 - \mu|.$$

If $\mu=0.5$, then $$|E_{op,m} - E_{new}| = \frac{10}{\ln 10}\frac{1}{4m}.$$

For Rayleigh fading, m=1. Thus, the difference is 1 dB. However, the difference becomes negligible when m increases and all of the estimators approach the CRLB. If $\mu=0$, the estimator (4) is the same as the sample-average estimator. Also, equation (7) does not apply to the case when $\mu=1.0$ since in equation (4), the first term will be zero and the resulting estimator will be the sample-average estimator.

The mean value of the proposed estimator $E_{new}$, $\overline{E_{new}}$ is easily obtained with the help of equation (23) in the Ko et al. reference and also equation (3); and the bias of $E_{new}$ can be shown to be given as $$|E_{new} - \overline{X}| = \kappa(1-\mu)|\psi(mN) - \psi(m) - \ln(N)| \quad (9)$$

Using the approximation $\psi(x) \approx \ln x$, equation (7) can be shown to be asymptotically unbiased as the Nakagami parameter m and the number of samples N increases. Also, the variance of $E_{new}$ is always smaller than the sample-average estimator. A simulation shown herein below further reveals that the mean square error of $E_{new}$ is smaller than the one of $E_{op,m}$ over the correlated Rayleigh channels, which defeats the first assumption (i.i.d. assumption) disclosed in the published art. Even though the optimal value for $\mu$ can be a function of the degree of correlation (i.e. Doppler spread frequency or vehicle speed), the present inventors recommend $\mu=0.5$ regardless of the vehicle speed.

From equation (5), one property of the inventive estimator can be seen to be that if the channel is Nakagami-m distributed, the estimators do not need to estimate m since the m-estimate is inside the estimator (4). Further, when the channel approaches the AWGN case, i.e., m->∞, the difference between the SIR estimator (3) and the optimum estimator (2) (assuming perfect m estimate) is zero. This property was recognized by the present inventors to have a nice application in W-CDMA (radio link quality monitoring where the monitored SIR may be very low, e.g., -5 dB). At such low SIR, the accuracy is important since the transmitter may be turned off too early if an estimator underestimates the SIR too much and may be turned on too early if an estimator overestimates the SIR too much. Simulation results are discussed and shown in Table 1 below in association with a discussion of radio link quality monitoring simulation.

The normalized mean square error (MSE) is now defined for a performance comparison of the SIR estimators described herein before. The normalized MSE is defined as $$MSE = E\left[\left(\frac{\hat{X} - X}{X}\right)^2\right],$$

where $\overline{X}$ is the true SIR in a dB scale and the $\hat{X}$ denotes the estimated SIR. FIGS. 1a–1d, 2a–2d and 3a–3d show the MSE of three different SIR estimators, $E_{sa}$, $E_{op}$, and $E_{new}$ for the target (true) SIR -10, -5, 5 and 10 dB over Rayleigh fading channels with vehicle speed 3 km/hr, 30 km/hr and 120 km/hr respectively. The sampling frequency and the carrier frequency for this simulation were set up to 15 KHz and 2.11 GHz, respectively, which is the case for the pilot signals in W-CDMA systems disclosed in 3GPP TS 25.101: "UE Radio Transmission and Reception (FDD)". These figures clearly show that one embodiment of the inventive estimator gives the best performance over most vehicle speeds. In particular, for the low 3 km/hr vehicle speed, $E_{new}$ significantly outperforms $E_{sa}$ and $E_{op}$. However, as the vehicle speed increases, which can be equivalently interpreted as the samples becomes uncorrelated, the performance of $E_{new}$, is very close to the ones of $E_{sa}$ and $E_{op}$. For all cases, when the true SIR=5 dB, a large error is seen for all estimator methods. The present inventors discovered that when SIR=5 dB, the Rayleigh fading simulator always provided some data samples far away from the true signal level.

Figure 4:
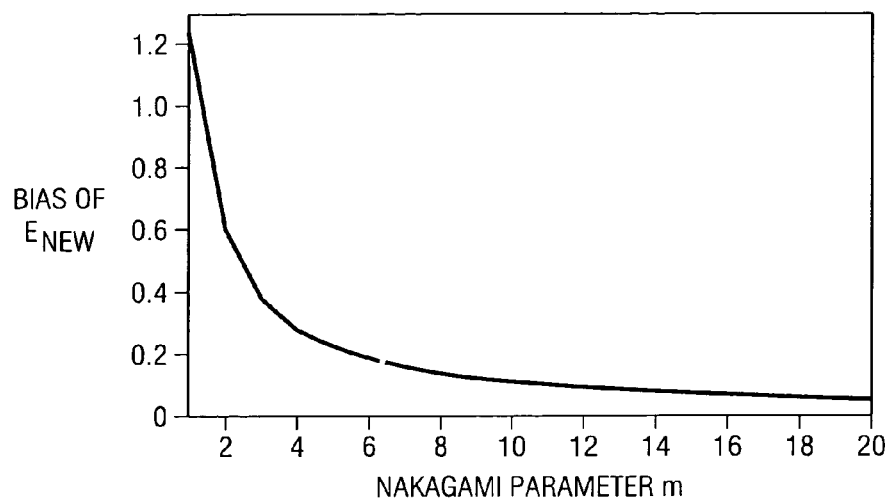
FIG. 4 is a graph depicting bias of $E_{new}$, versus Nakagami parameter m.

The bias associated with one embodiment the inventive estimator $E_{new}$ was given herein before as equation (7). FIG. 4 shows the bias of $E_{new}$ versus the Nakagami parameter m, and clearly demonstrates that the bias is negligible as the Nakagami parameter m increases.

Application to W-CDMA:

In UMTS/W-CDMA systems, multiple power control schemes are used for both uplink and downlink. Open-loop power control is used for initial power setting at the beginning of a connection. Closed-loop power control including inner loop and outer loop is used for continuous transmission power adjustment.

Within the inner loop power control, the receiver performs frequent estimations of the received SIR and compares it to a target SIR. If the measured SIR is higher than the target SIR, the receiver will generate a power down command and send it back to the transmitter; if the measured SIR is below the target SIR, the receiver will generate a power up command and send it to transmitter. The measure-command-react cycle is operated at 1500 Hz. The outer loop power control adjusts the target SIR depending on the link needs and quality of service (QoS), such that the QoS is met using minimal transmission power.

Test case 8.8.1 described in 3GPP TS 25.101: "UE Radio Transmission and Reception (FDD)" is exemplary. The following italicized text including Table 8.29 is extracted from the 3GPP TS.101 reference.

8.8.1.1 Minimum Requirements

For the parameters specified in Table 8.29 the downlink $$\frac{DPCH\_E_c}{I_{or}}$$

power measured values, which are averaged over one slot, shall be below the specified value in Table 8.30 more than 90% of the time. BLER shall be as shown in Table 8.30. Power control in downlink is ON during the test.

TABLE 8.29

Test parameter for downlink power control

| Parameter | Unit | Test 1 | Test 2 |
|---|---|---|---|
| $\hat{I}_{or}/I_{oc}$ | DB | 9 | −1 |
| $I_{oc}$ | dBm13.84 | | −60 |
| Information Data Rate | Kbps | | 12.2 |
| Target quality value on DTCH | BLER | | 0.01 |
| Propagation condition | | | Case 4 |
| Maximum DL_Power | DB | | 7 |
| Minimum DL_Power | DB | | −18 |
| DL Power Control step size, $\Delta_{TPC}$ | DB | | 1 |
| Limited Power Increase | — | | "Not used" |

A simulation was performed by the present inventors in which the noise power was estimated from common pilot channels (CPICH). Within one slot period (667 us) as defined in W-CDMA, both the sample mean and the inventive methodology were used to estimate signal energy (through dedicated pilots). Since the so-called optimum method was shown herein before to not perform well in correlated fading cases, the simulation only compared the sample mean method and the inventive methodology. Upon estimating the slot SIR, one IIR filter was employed to smooth the slot SIR estimates. The forgetting factor in the IIR filter was varied and the simulation results are summarized as follows:

1. For the same frame error rate (FER), the system with the inventive SIR estimate method requires a smaller average transmit power compared with the system with the sample mean SIR estimate method;

2. For the same transmit power, the system with the inventive SIR estimate method achieves a smaller FER compared with the system with the sample mean SIR estimate method;

3. The system with the inventive SIR estimate method has a smaller target SIR variation compared with the system with the sample mean SIR estimate method; and 4. The FER of the system with the inventive SIR estimate method is NOT sensitive to the forgetting factor while the FER of the system with the sample mean SIR estimate method is very sensitive to the forgetting factor.

Application to Radio Link Quality Monitoring:

There are also radio link quality tests described in 3GPP TS 25.101: "UE Radio Transmission and Reception (FDD)". The following italicized texts are extracted from the 3GPP TS 25.101 reference.

6.4.4 Out-of-Synchronization Handling of Output Power

The UE shall monitor the DPCCH quality in order to detect a loss of the signal on Layer 1, as specified in TS 25.214. The thresholds $Q_{out}$ and $Q_{in}$ specify at what DPCCH quality levels the UE shall shut its power off and when it shall turn its power on respectively. The thresholds are not defined explicitly, but are defined by the conditions under which the UE shall shut its transmitter off and turn it on, as stated in this subclause.

The DPCCH quality shall be monitored in the UE and compared to the thresholds $Q_{out}$, and $Q_{in}$ for the purpose of monitoring synchronization. The threshold $Q_{out}$ should correspond to a level of DPCCH quality where no reliable detection of the TPC commands transmitted on the downlink DPCCH can be made. This can be at a TPC command error ratio level of e.g. 30%. The threshold $Q_{in}$ should correspond to a level of DPCCH quality where detection of the TPC commands transmitted on the downlink DPCCH is significantly more reliable than at $Q_{out}$. This can be at a TPC command error ratio level of e.g. 20%.

1.6.2.1 6.4.4.1 Minimum Requirement

When the UE estimates the DPCCH quality over the last 160 ms period to be worse than a threshold $Q_{out}$, the UE shall shut its transmitter off within 40 ms. The UE shall not turn its transmitter on again until the DPCCH quality exceeds an acceptable level $Q_{in}$. When the UE estimates the DPCCH quality over the last 160 ms period to be better than a threshold $Q_{in}$, the UE shall again turn its transmitter on within 40 ms. The UE transmitter shall be considered "off"—if the transmitted power is below the level defined in subclause 6.5.1 (Transmit off power). Otherwise the transmitter shall be considered as "on".

1.6.2.2 6.4.4.2 Test case

This subclause specifies a test case, which provides additional information for how the minimum requirement should be interpreted for the purpose of conformance testing. The quality levels at the thresholds $Q_{out}$ and $Q_{in}$ correspond to different signal levels depending on the downlink conditions DCH parameters. For the conditions in Table 6.6, a signal with the quality at the level $Q_{out}$ can be generated by a DPCCH_Ec/Ior ratio of −25 dB, and a signal with $Q_{in}$, by a DPCCHEc/Ior ratio of −21 dB. The DL reference measurement channel (12.2) kbps specified in subclause A.3.1 and with static propagation conditions. The downlink physical channels, other than those specified in Table 6.6, are as specified in Table C.3 of Annex C.

Figure 6:
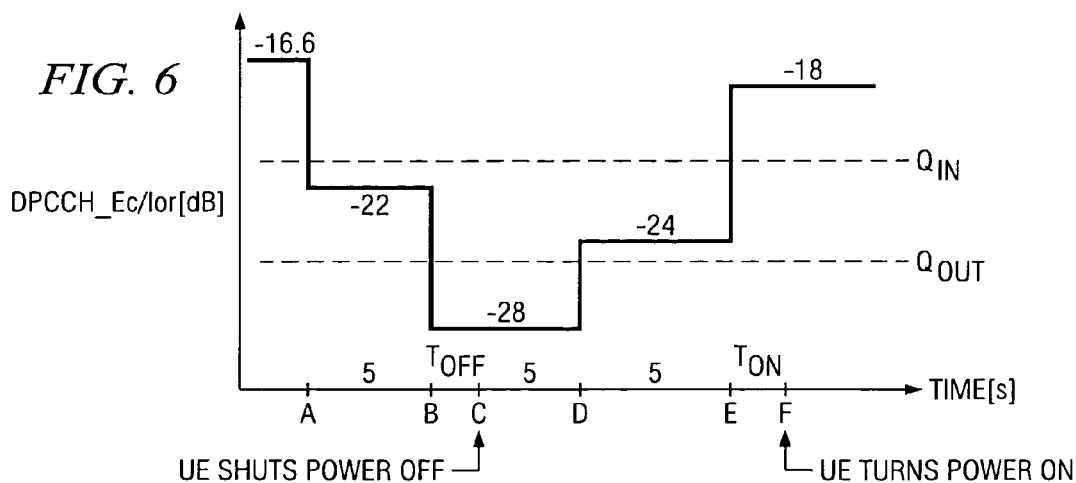
FIG. 6 depicts FIG. 6.1: Test case for out-of-synch handling in the UE that is illustrated in TS 25.214.

FIG. 6.1 shows an example scenario where the DPCCH_Ec/Ior ratio varies from a level where the DPCH is demodulated under normal conditions, down to a level below $Q_{out}$, where the UE shall shut its power off and then back up to a level above $Q_{in}$ where the UE shall turn the power back on.

TABLE 6.6

DCH parameters for the Out-of-synch handling test case

| Parameter | Unit | Value |
|---|---|---|
| $\hat{I}_{or}/I_{oc}$ | dB | −1 |
| $I_{oc}$ | dBm/3.84 MHz | −60 |
| DPDCH_$E_c$/$I_{or}$ | dB | See FIG. 6.1: Before point A −16.6 After point A Not defined |
| DPCCH_$E_c$/$I_{or}$ | dB | See FIG. 6.1 |
| Information Data Rate | kbps | 12.2 |

FIG. 6.1: Test case for out-of-synch handling in the UE (See FIG. 6 that depicts FIG. 6.1)

In this test case, the requirements for the UE are that:
1. The UE shall not shut its transmitter off before point B.
2. The UE shall shut its transmitter off before point C, which is $T_{off}$=200 ms after point B.
3. The UE shall not turn its transmitter on between points C and E.
4. The UE shall turn its transmitter on before point F, which is $T_{on}$=200 ms after point E.

Note that the TPC quality is used for the test described herein above. However, since there may be only two TPC bits, direct estimation of radio quality from the TPC bits may be difficult. The present inventors realized if one can estimate the power offset between the TPC bits and the dedicated pilot bits or DPCH bits, then the SIR estimate can be used for the dedicated pilots to calculate the SIR for the TPC bits. Simulation results for 100 samples are summarized in Table 1 discussed herein before which clearly demonstrate the superiority of the inventive method over the sample mean method although the inventive method has a slightly larger variance. The expected SIRs in the first column of Table 1 correspond to the Ec/Ior in FIG. 6.1 sequentially, i.e., −16.6, −22, −28, −24 and −18 dB.

TABLE 1

Radio link quality test

| Expected | Inventive Method | | Sample mean Method | |
|---|---|---|---|---|
| SIR (dB) | mean | variance | mean | variance |
| 3.4721 | 3.4359 | 0.032 | 3.713 | 0.031 |
| −1.9279 | −2.17 | 0.10 | −1.164 | 0.065 |
| −7.9279 | −7.77 | 0.189 | −5.46 | 0.1268 |
| −3.9279 | −4.25 | 0.1586 | −2.77 | 0.082 |
| 2.0721 | 2.01 | 0.04 | 2.40 | 0.037 |

Figure 5:
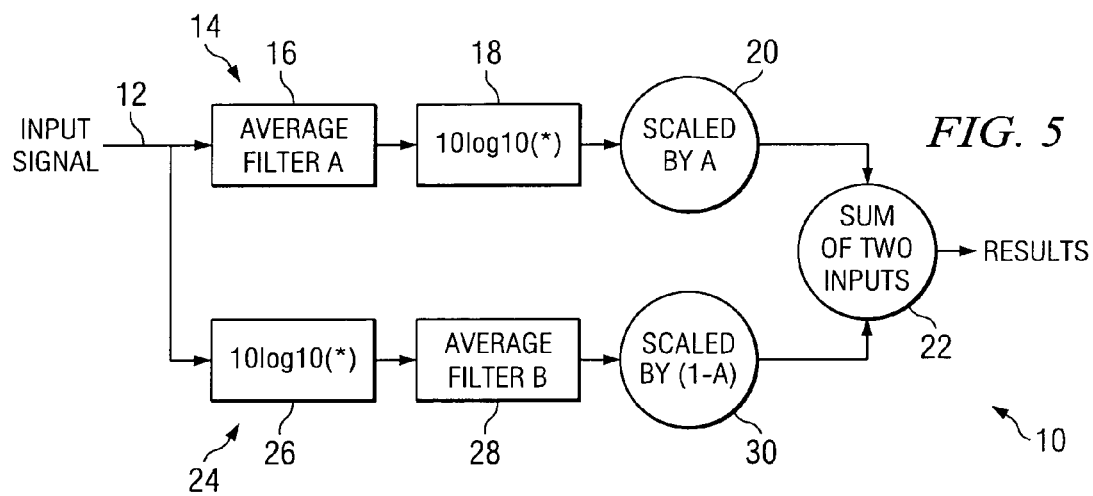
FIG. 5 is a general signal processing flow diagram for any dB value estimation.

Looking now at FIG. 5, a general signal processing flow diagram 10 for any dB value estimation is shown in accordance with the most preferred embodiment of the present invention. Processing flow 10 can be applied to any parameter whose dB value is required to be estimated. The input signal 12 could be the despread signal in W-CDMA such as discussed herein before. In the upper branch 14, the signal is first averaged through Average Filter A 16; and the resulting signal is then converted to the dB domain via a first log filter 18. Next, the dB main value in the upper branch 14 is scaled 20 by a non-negative real number 'a' before it is fed into the final adder 22. In the lower branch 24, the same input signal 12 is first converted to the dB domain via a second log filter 26; and the resulting signal is averaged through Average Filter B 28. Next, the output of Average Filter B 28 is further scaled 30 by (1−'a') before it is fed into the final adder 22. The final result is the output of the adder 22. Filters 16, 28 can be identical types.

A special case of processing flow 10 shown in FIG. 5 can be applied for signal-to-noise estimation such as discussed herein before, where the input signal is the instantaneous signal power divided by the estimated noise power. The signal-to-noise estimation procedure commences by first getting the signal estimate S for each slot. Next, the noise N is estimated for each slot. The instantaneous ratio of S/N is then the input signal for the signal-to-noise estimation procedure. The average S/N is obtained via Average Filter A 16 in upper branch 14. The log domain value (denoted herein as x1) of the average S/N is then obtained via Log Filter 18. Log domain value x1 is scaled 20 by a. This procedure is repeated in the lower branch 24 where the log domain value (denoted herein as x2) of S/N is first obtained via Log Filter 26. This log domain value x2 is then averaged through Filter B 28 and subsequently scaled 30 by (1−a). The sum 22 of a*x1 and (1−a)*x2 are then generated as a*x1+(1−a)*x2. It can be appreciated that further averaging of the final result a*x1+(1−a)*x2 may be necessary, depending on the particular application.

In summary explanation, a methodology which provides a general solution for parameters that need to be estimated in dB value and in which the bias is corrected inherently without using any table(s), is compared with the optimum estimator and the sample mean estimator, both analytically and numerically. The results clearly demonstrate the advantages of the inventive methodology over the most widely used SIR estimator under various channel conditions. The methodology (and apparatus) uses a linear combination of two filters: one is in the linear domain, while the other is in the log domain. The resulting estimator automatically corrects the bias while known methods and techniques employ complicated tables to correct the bias. While known methods and techniques depend on the channel model and Doppler spread, the inventive methodology is independent of the channel model since the associated estimator inherently estimates the channel model parameters.

This invention has been described in considerable detail in order to provide those skilled in the wireless communication art with the information needed to apply the novel principles and to construct and use such specialized components as are required. In view of the foregoing descriptions, it should be apparent that the present invention represents a significant departure from the prior art in construction and operation. However, while particular embodiments of the present invention have been described herein in detail, it is to be understood that various alterations, modifications and substitutions can be made therein without departing in any way from the spirit and scope of the present invention, as defined in the claims which follow.

For example, the inventive methodology is not limited to the SINR estimate. The inventive methodology can just as well be applied to any application that requires log or dB measurements, e.g. RSSI measurement, ISCP measurement and the like. The present inventors have shown the inventive methodology to improve system capacity through applications that may be used in CDMA systems. Some of these applications include 1. Radio link quality monitoring: the accuracy of the SINR estimator is very important here since the bias or error will make the UE shut off too early or turn on too late. If the UE is able to maintain certain transmission quality but we shut off the transmitter, this UE's throughput will suffer. On the other hand, if the UE turns on its power too earlier, excess interference will be generated in the network and therefore, the system capacity will suffer due to interference limited nature of the CDMA systems.

2. Finger management: in the Rake receiver, when to include a path or not for combining depends on the SINR or signal strength of that path. If we combine a very weak path, it will reduce the effective SINR at the Rake receiver output; and then either a high transmit power is required to maintain the same quality of service or a retransmission is required if there are frame errors. Both approaches will increase the extra interference to the network, which eventually decreases the system throughput.

3. Finger lock in AFC (automatic frequency control): Certain important estimators such as lock detectors for frequency and time tracking and Doppler spread estimator can be collaborated with the SINR estimator. For example, the frequency or time tracking lock detector declares the "in-lock" when the SINR is above a certain level. The Doppler spread estimator based on the covariance method can be enhanced by the accurate SINR estimator. The accurate estimator in the communication systems improves the system performance such as the bit-error rate and therefore increases the channel throughput.

4. RSSI measurement: RSSI measurement may be used for handoff decisions. The benefits of an accurate RSSI measurement are obvious.

5. Handoff: SINR measurement may be used for handoff decision. The benefits of an accurate SINR measurement are obvious to those skilled in the art and so will not be discussed further to preserve clarity and brevity.

The invented methodology has been shown to be less complex than systems and methods known in the art, and has also been shown to not require any extra feedback from the Rake receiver output (which is very expensive in the receiver system). Further, due to power offset between the data portion and the dedicated pilot portion, the common pilot channel introduced into the latest 3GPP standard, an iterative channel estimate which has been proposed for improving estimating SINR is not required.

What is claimed is:

1. A method of signal estimation over a generalized fading channel, the method comprising the steps of:
   averaging an input signal via a first averaging filter to generate a first averaged output signal;
   filtering the first averaged output signal via a first log filter to generate a first log domain value;
   scaling the first log domain value by a first constant;
   filtering the input signal via a second log filter to generate a second log domain value;
   averaging the second log domain value via a second averaging filter to generate a second averaged output signal;
   scaling the second averaged output signal by a second constant; and
   summing the second averaged output signal with the scaled first log domain value to generate an estimated signal over the generalized fading channel.

2. The method according to claim 1 wherein the input signal is generated via a method comprising the steps of:
   generating a signal estimate S for each input signal slot;
   generating a noise estimate N for each input signal slot; and
   obtaining a signal-to-noise ratio S/N for each input signal slot and generating the input signal there from.

3. The method according to claim 2 wherein the step of averaging an input signal via a first averaging filter to generate a first averaged output signal comprises averaging each input signal slot signal-to-noise S/N ratio through the first averaging filter.

4. The method according to claim 3 wherein the step of filtering the first averaged output signal via a first log filter to generate a first log domain value comprises filtering each averaged input signal slot S/N ratio via the first log filter to generate its associated log domain value x1.

5. The method according to claim 4 wherein the step of scaling the first log domain value by a first constant comprises scaling each log domain value x1 by a constant value a.

6. The method according to claim 5 wherein the step of filtering the input signal via a second log filter to generate a second log domain value comprises filtering each input signal slot signal-to-noise S/N ratio through the second log filter to generate its associated log domain value x2.

7. The method according to claim 6 wherein the step of averaging the second log domain value via a second averaging filter to generate a second averaged output signal comprises averaging each log domain value x2 through the second averaging filter.

8. The method according to claim 7 wherein the step of scaling the second averaged output signal by a second constant comprises scaling each averaged log domain value x2 by a constant value (1−a).

9. The method according to claim 8 wherein the step of summing the second averaged output signal with the scaled first log domain value to generate an estimated signal over the generalized fading channel comprises summing each scaled log domain value a*x1 and each scaled averaged log domain value (1−a)*x2 and generating the estimated signal over the generalized fading channel there from.

10. A wireless communication system comprising:
   a first signal averaging filter configured to average an input signal there through;
   a first log filter configured to generate a first log domain value in response to the averaged input signal;
   a first scaling element configured to scale the first log domain value by a first constant;
   a second log filter configured to generate a second log domain value in response to the input signal;
   a second signal averaging filter configured to average the second log domain value there through;
   a second scaling element configured to scale the averaged second log domain value by a second constant; and
   a summing element configured to add the scaled first log domain value and the scaled averaged second log domain value to generate an estimated signal over a generalized fading channel in response to the input signal.

11. The wireless communication system according to claim 10 wherein the estimated signal is a dB signal.

12. The wireless communication system according to claim 10 wherein the first constant is a non-negative real number.

13. The wireless communication system according to claim 10 wherein the second constant is a number equal to 1—the non-negative real number.

14. The wireless communication system according to claim 10 wherein the input signal is the instantaneous signal to noise estimate S/N.

15. The wireless communication system according to claim 14 wherein the instantaneous input signal power S is associated with a single signal slot.

16. The wireless communication system according to claim 15 wherein the estimated input signal noise power N is associated with a single signal slot.

17. The wireless communication system according to claim 16 wherein the first signal averaging filter is operational to average the instantaneous signal to noise estimates S/N there through.

18. The wireless communication system according to claim 17 wherein the first log filter is operational to generate a first log domain value x1 in response to the averaged instantaneous signal to noise estimates S/N.

19. The wireless communication system according to claim 18 wherein the first scaling element is operational to scale the first log domain value x1 by a non-negative constant a.

20. The wireless communication system according to claim 19 wherein the second log filter is operational to generate a second log domain value x2 in response to the instantaneous signal to noise estimates S/N.

21. The wireless communication system according to claim 20 wherein the second signal averaging filter is operational to average the second log domain value x2 there through.

22. The wireless communication system according to claim 21 wherein the second scaling element is operational to scale the averaged second log domain value x2 by a second constant equaling 1−a.

23. The wireless communication system according to claim 22 wherein the summing element is operational to add the scaled first log domain value a*x1 and the scaled averaged second log domain value (1−a)*x2 to generate an estimated signal [a*x1+(1−a)*x2] over a generalized fading channel in response to the instantaneous signal to noise estimate S/N.

* * * * *

UNITED STATES PATENT AND TRADEMARK OFFICE
CERTIFICATE OF CORRECTION

PATENT NO. : 7,046,963 B2 Page 1 of 1
APPLICATION NO. : 10/353489
DATED : May 16, 2006
INVENTOR(S) : Tao Luo and Young-Chai Ko It is certified that error appears in the above-identified patent and that said Letters Patent is hereby corrected as shown below:

On the title page, insert item [63]: after paragraph (65) but before paragraph (51) please insert and correct to read:

-- Related U.S. Application Data

Provisional application No. 60/431,290, filed on Dec. 06, 2002. --

Signed and Sealed this

Eighteenth Day of March, 2008

JON W. DUDAS
*Director of the United States Patent and Trademark Office*